C. A. BROWN.
ALTERNATING CURRENT WATTMETER.
APPLICATION FILED DEC. 3, 1903. RENEWED APR. 11, 1907.
907,567.
Patented Dec. 22, 1908.
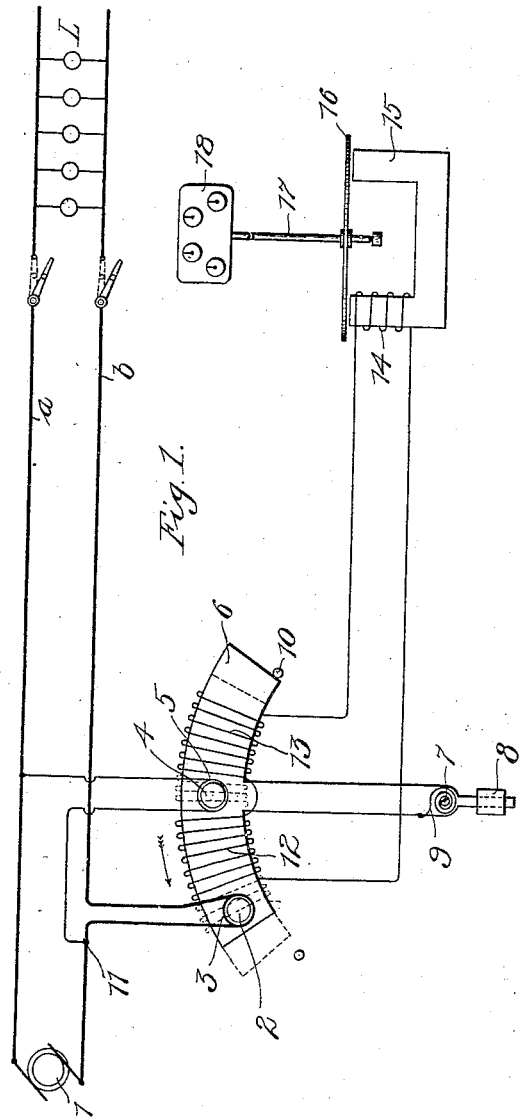
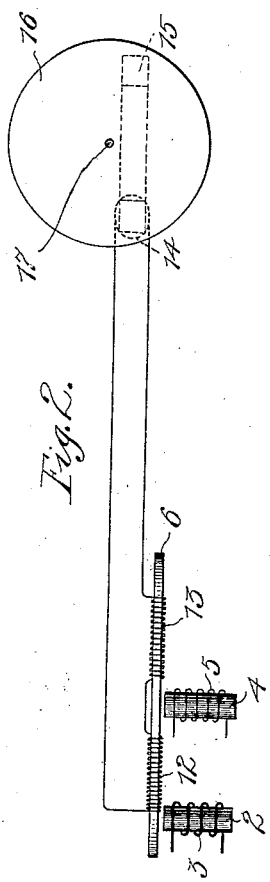
Witnesses:
Leonard W. Novander
Charles J. Schmidt
Inventor
Charles A. Brown

UNITED STATES PATENT OFFICE.

CHARLES A. BROWN, OF CHICAGO, ILLINOIS.

ALTERNATING-CURRENT WATTMETER.

No. 907,567.      Specification of Letters Patent.      Patented Dec. 22, 1908.

Application filed December 3, 1903, Serial No. 183,632. Renewed April 11, 1907. Serial No. 367,587.

*To all whom it may concern:*

Be it known that I, CHARLES A. BROWN, citizen of the United States, residing at Chicago, in the county of Cook and State of Illinois, have invented a certain new and useful Improvement in Alternating-Current Wattmeters, of which the following is a full, clear, concise, and exact description, reference being had to the accompanying drawings, forming a part of this specification.

My invention relates to alternating current wattmeters and its object is to provide means for producing on a measuring element, by means of a single energizing coil, a torque proportional to the watts flowing through the circuit to be measured. I, therefore, associate with a rotatable measuring element a field core upon which is wound a single energizing coil which will produce a single field through the armature to cause rotation thereof. To cause the torque created by said single energizing coil to be proportional to the watts flowing through the circuit to be measured, I serially include extraneous windings in circuit with said coil, which windings may be disposed upon a disk or frame of either magnetic or non-magnetic material. A magnet core is provided with a winding included serially in one limb of the circuit to be measured and another magnet core is provided with a winding connected in bridge of the circuit to be measured, the faces of these magnet cores being disposed before said frame or disk, which may be pivoted, and as current flows through both the series winding and the shunt winding, the supporting frame is swung to bring the windings under the influence of the current and pressure fields created by the current and pressure windings respectively, thus impressing upon the extraneous windings a current which is proportional to the watts flowing through the circuit, and the single energizing coil being serially included with said extraneous windings will produce a torque proportional to the watts. The frame may be spring actuated so that when there is no current flowing through the series winding there will be no rotation of the frame and the windings thereof will be held without the influence of the current or pressure fields.

The drawing will more clearly illustrate my invention and, Figure 1 is a diagrammatic view of apparatus connected with the circuit to be measured, and Fig. 2 is a top view of the device employed, showing the disposition of the windings and field magnets with respect to the movable elements.

A source of current 1 supplies current to translating devices L through the circuit limbs *a* and *b*. A field core 2 is provided with a winding 3 included serially in the limb *b*, and the electromagnet 4 is provided with a winding 5 connected in shunt of the limbs *a* and *b*. A supporting frame or disk 6, which may be T-shaped, as shown, is mounted upon a pivot 7 and counterbalanced by a weight 8, and a spring 9 may serve to normally retain said spring against a stop 10. The pole faces of the field cores 2 and 4 are disposed against the frame 6, as shown in Fig. 2, and upon current passing through both the current coil 3 and the shunt coil 5 rotation of the frame will result toward the left, the distance of such oscillation depending upon the amount of current flowing through the current coil, this rotation being occasioned by the attraction of the energized magnet 2 for the field created in the disk by the energized electromagnet 4.

When the translating devices are entirely disconnected from the line, that is, under no-load conditions, there will be no current flowing through the current coil and, consequently, there can be no attraction by the electromagnet 2 to cause rotation of the frame. The pressure coil is connected with the limb *b* at a point 11 in advance of the current coil to prevent a circuit being formed through the current coil and pressure coil under no load conditions.

I provide a winding upon the frame which may consist of sections 12 and 13, each wound upon one limb of the T-shaped frame.

When there is no current flowing through the circuit to be measured the frame will be disposed as shown in full lines in the figures, to withhold the windings from the influence of the field cores, but upon current flowing through the current coil the frame will be rotated, as shown by dotted lines, to bring more or less of the coils into inductive relation with the energizing windings 3 and 5, depending upon the amount of current flowing, and the current impressed on the windings 12 and 13 will be proportional to the watts flowing through the circuit to be measured.

I include a single energizing coil 14 serially in circuit with the windings 12 and 13, and dispose this energizing winding about one pole of a meter field core 15, disposed with reference to a measuring element 16 in the shape of a disk, as shown in Fig. 2, the field core 15 thus energized producing a single field through the armature to cause rotation thereof, and the current through the windings 12 and 13 being proportional to the watts, necessarily causes the current through the energizing coil to be proportional to the watts and, consequently, the torque produced on the measuring element 16 will also be proportional to the watts through the measured circuit. The movable element 16 may be mounted upon a spindle 17 to connect with a registering train 18, as is well known in the art.

As before stated, under no load conditions, there will be no deflection of the frame and, consequently, no current flowing through the windings 12 and 13, due to the influence of the pressure coil alone, and consequently the meter will not register.

I do not wish to be limited to the precise arrangement shown, as those skilled in the art may readily make changes without departing from the scope of the invention.

I desire to secure by Letters Patent the following claims:—

1. In a device of the class described, the combination with a movable element, of means for producing on said movable element a torque proportional to the watts to be measured through a single energizing circuit receiving its current by induction.

2. In a device of the class described, the combination with a movable element, of an energizing circuit in inductive relation therewith, and means for producing in said circuit by induction a current proportional to the watts to be measured, substantially as described.

3. In a device of the class described, the combination with a movable element, of an energizing circuit in inductive relation therewith, a winding included in circuit with said energizing circuit, a current winding for producing a field proportional to the current flowing through the circuit to be measured, a pressure winding for producing a field proportional to the pressure on the circuit, and means for permitting said winding to be brought within the influence of said current and pressure fields, whereby a current is generated in said winding and said energizing circuit to produce a torque upon said movable element proportional to the watts to be measured, substantially as described.

4. In a device of the class described, the combination with a movable measuring element, of a torque producing circuit in inductive relation therewith, an extraneous winding included serially in circuit with said torque producing circuit, a supporting frame for said extraneous winding, a series field producing coil in inductive relation with said frame and included serially in the circuit to be measured, a pressure field producing coil inductively associated with said frame and connected with the circuit to be measured, and means upon current flowing through said current field coil for permitting said winding to be brought by said frame within the influence of the current and pressure fields, whereby a current is generated in said winding and said torque producing circuit proportional to the watts to be measured, substantially as described.

5. In a device of the class described, the combination with a movable element, of a torque producing circuit in inductive relation therewith, extraneous windings connected serially in circuit with said torque producing circuit, a rotatable frame upon which said windings are mounted, a series field producing winding inductively associated with said frame and included serially in the main circuit, and a pressure field producing winding inductively associated with said frame and connected with the circuit to be measured, current flow through both said current and pressure windings causing rotation of said frame to carry said extraneous windings within the influence of the fields created by said current and pressure windings, whereby a current is created in said extraneous windings and the torque producing circuit which is proportional to the watts in the circuit to be measured, substantially as described.

6. In a device of the class described, the combination with a movable element, of a torque producing circuit in inductive relation therewith, an extraneous winding included serially in circuit with said torque producing circuit, a current field proportional to the current flowing through the circuit to be measured, a pressure field proportional to the pressure of the circuit to be measured, means for withholding said extraneous windings from the influence of said fields upon no current flowing through the circuit to be measured, and means for permitting said extraneous winding to be brought within the influence of said fields upon current flow through the circuit to be measured, whereupon a current is created in said extraneous winding and the torque producing circuit which is proportional to the watts to be measured, substantially as described.

7. In a device of the class described, the combination with a movable element, of a torque producing circuit in inductive relation therewith, an extraneous winding connected serially in circuit with said torque producing circuit, a rotatable frame upon which said extraneous winding is carried, a current coil in inductive relation with said frame and included serially in the circuit to be measured, a pressure coil in inductive relation with said frame and connected with the circuit, means for withholding said extraneous winding out of the influence of said current and pressure coils upon no current flowing through the circuit to be measured, said extraneous winding being brought within the influence of the current and pressure coils upon current flowing through the circuit to be measured, whereby a current proportional to the watts to be measured is created in said extraneous winding and the torque producing circuit, substantially as described.

8. In a device of the class described, the combination with a secondary energizing circuit, of means for inducing in said energizing circuit a current proportional to the watts to be measured, and a movable element in inductive relation with said energizing circuit, substantially as described.

9. In a device of the class described, the combination with a movable element, of an energizing circuit adapted to produce a torque on said movable element, and current and pressure circuits in inductive relation with said energizing circuit, substantially as described.

10. In a device of the class described, the combination with a movable element, of an energizing circuit adapted to bear induced current in inductive relation to said movable element and to produce a rotative tendency therein proportional to the watts to be measured, substantially as described.

11. In a device of the class described, the combination with a movable element, of a single energizing circuit adapted to produce a torque on said movable element, a winding included in said circuit, and pressure and current circuits in inductive relation with said winding and adapted to induce in said winding and said circuit a current proportional to the watts to be measured.

12. In a device of the class described, the combination with a movable element, of a secondary energizing circuit, a torque producing winding in said circuit in inductive relation with said movable element, a winding in said circuit, a supporting frame carrying said winding, and current and pressure circuits in inductive relation with said winding and connected with the primary circuit, current through said primary and secondary circuits causing actuation of said supporting frame to carry said winding into inductive relation with said circuits, whereby a current is produced in the secondary circuit and through the torque producing winding which is proportional to the watts to be measured.

13. In a device of the class described, the combination with a movable element, of a secondary circuit containing windings 12, 13 and a torque producing coil 14 for said movable element, a pivoted supporting frame 6 for carrying said windings, and series and pressure windings 3 and 5 connected with the primary circuit $a\ b$ and adapted to be inductively related with said windings, current through both said energizing windings causing movement of said supporting frame to bring the windings 12, 13 into inductive relation with said energizing windings, whereby a current is induced in the secondary circuit and the coil 14 which is proportional to the watts to be measured.

14. In a device of the class described, the combination with a movable measuring element, of a torque-producing circuit in inductive relation therewith, an extraneous winding included serially in said torque-producing circuit, a movable magnetic frame, a series field producing coil in inductive relation with said frame and included serially in the circuit to be measured, a pressure field producing coil inductively associated with said frame and connected with the circuit to be measured, said extraneous winding being normally out of inductive relation with the current and pressure field windings, said frame being moved to bring the extraneous winding into inductive relation with the current and pressure field windings upon current flow through the circuit to be measured.

15. In a device of the class described, the combination with a current and pressure field windings connected with the circuit to be measured, of a movable magnetic frame in inductive relation therewith, a secondary circuit including a secondary winding and an energizing winding, a movable element subject to the torque produced by said energizing winding, said secondary winding being normally out of inductive relation with the current and pressure windings, current flow through said current winding causing motion of said magnetic frame, whereby said secondary winding is brought into inductive relation with the current and pressure windings, the current induced in said secondary circuit and through said energizing coil being proportional to the watts to be measured.

16. In a device of the class described, the combination with current and pressure windings connected with the circuit to be measured, of a movable magnetic frame associated with said windings, a secondary circuit, a secondary winding in said secondary circuit associated with the current winding, a second secondary winding in said secondary circuit associated with the pressure winding, an energizing coil in said secondary circuit, a movable measuring element associated with said energizing winding, said secondary windings being normally out of inductive relation with the current and pressure windiugs, said frame being so disposed that upon current flow through said current winding said magnetic frame will be moved to bring the secondary windings in inductive relation with the current and pressure windings.

In witness whereof, I hereunto subscribe my name this 30th day of November A. D., 1903.

CHARLES A. BROWN.

Witnesses:
   HARVEY L. HANSON,
   CHARLES J. SCHMIDT.